(12) United States Patent
Abd El Haq et al.

(10) Patent No.: US 10,828,703 B2
(45) Date of Patent: Nov. 10, 2020

(54) FOOL-PROOF TOOL COUPLING HAVING AXIALLY SPACED APART DRIVE MEMBERS AND ASSEMBLY METHOD THEREFOR

(71) Applicant: Iscar, Ltd., Tefen (IL)

(72) Inventors: Basel Abd El Haq, Horfesh (IL); Tsahi Ashkenazi, Karmiel (IL); Alexey Galianov, Kiriat-Ata (IL)

(73) Assignee: Iscar, Ltd., Tefen (IL)

( * ) Notice: Subject to any disclaimer, the term of this patent is extended or adjusted under 35 U.S.C. 154(b) by 321 days.

(21) Appl. No.: 16/038,261

(22) Filed: Jul. 18, 2018

(65) Prior Publication Data

US 2020/0023443 A1 Jan. 23, 2020

(51) Int. Cl.
*B23B 31/11* (2006.01)
*F16D 1/06* (2006.01)
(Continued)

(52) U.S. Cl.
CPC ............... *B23B 31/11* (2013.01); *F16D 1/06* (2013.01); *B23C 5/1072* (2013.01); *B23C 2210/02* (2013.01); *B23C 2250/12* (2013.01); *F16B 39/12* (2013.01); *Y10T 83/9382* (2015.04); *Y10T 403/10* (2015.01); *Y10T 403/7005* (2015.01)

(58) Field of Classification Search
CPC ............ Y10T 83/9379; Y10T 83/9382; Y10T 403/10; Y10T 403/7005; Y10T 403/7007; Y10T 403/7009; Y10T 409/309408; Y10T 409/30952; B23B 31/11; B23B 31/113; B23B 2240/00; B23B 2270/12; B23C 2210/02; B23C 2240/00; B23C 2240/24;
(Continued)

(56) References Cited

U.S. PATENT DOCUMENTS 1,824,509 A * 9/1931 Snader .................. B23B 31/113
279/89
1,975,877 A * 10/1934 Thomas ................ B23B 31/113
279/93
(Continued)

FOREIGN PATENT DOCUMENTS

CA 2789086 A1 * 8/2011 ........... B23B 31/113
CH 278685 A * 10/1951 ............... B25G 3/16

*Primary Examiner* — Sunil K Singh
*Assistant Examiner* — Michael Vitale
(74) *Attorney, Agent, or Firm* — Womble Bond Dickinson (US) LLP

(57) ABSTRACT

A tool coupling includes a first member, having a male coupling portion extending along a first axis, and a second member, having a female coupling portion extending along a second axis. The male coupling portion has front and rear drive members defining male front and rear footprints in respective first and second transverse mating planes. The female coupling portion has front and rear drive passages defining front and rear peripheral profiles in respective first and second transverse passage planes. The front and rear drive members respectively occupy the front and rear drive passages, and at least one of the front and rear drive members prevents rotation of the second member about the second axis. On imaginary rotation of the front peripheral profile by any angle about the second axis and axial projection thereof, the front peripheral profile overlaps (i.e., at least partially crosses) the rear footprint.

22 Claims, 7 Drawing Sheets

(51) Int. Cl.
*B23C 5/10* (2006.01)
*F16B 39/12* (2006.01)

(58) Field of Classification Search
CPC . B23C 2240/32; B23C 2270/12; F16B 21/09; F16D 1/06
USPC ............ 409/232, 234; 403/1, 348, 349, 350; 83/665, 666
See application file for complete search history.

(56) References Cited

U.S. PATENT DOCUMENTS

| | | | | |
|---|---|---|---|---|
| 2,103,379 | A | * | 12/1937 | Oxford ................. B23B 51/107 29/558 |
| 2,219,907 | A | * | 10/1940 | Ross .................... B23B 31/113 279/93 |
| 4,325,664 | A | * | 4/1982 | Mori .................... B23C 5/2278 279/8 |
| 4,361,196 | A | * | 11/1982 | Hoyle, Jr. ............. B23B 31/113 175/320 |
| 4,986,690 | A | * | 1/1991 | Cooksey ................ E21B 17/02 403/27 |
| 5,607,250 | A | * | 3/1997 | Tatterson .............. F16B 7/0413 403/325 |
| 8,708,611 | B2 | | 4/2014 | Marshansky |
| 9,725,962 | B2 | * | 8/2017 | Fischer ................ E21B 17/046 |
| 2007/0081873 | A1 | * | 4/2007 | Blomstedt ................ B23C 5/10 409/234 |

* cited by examiner

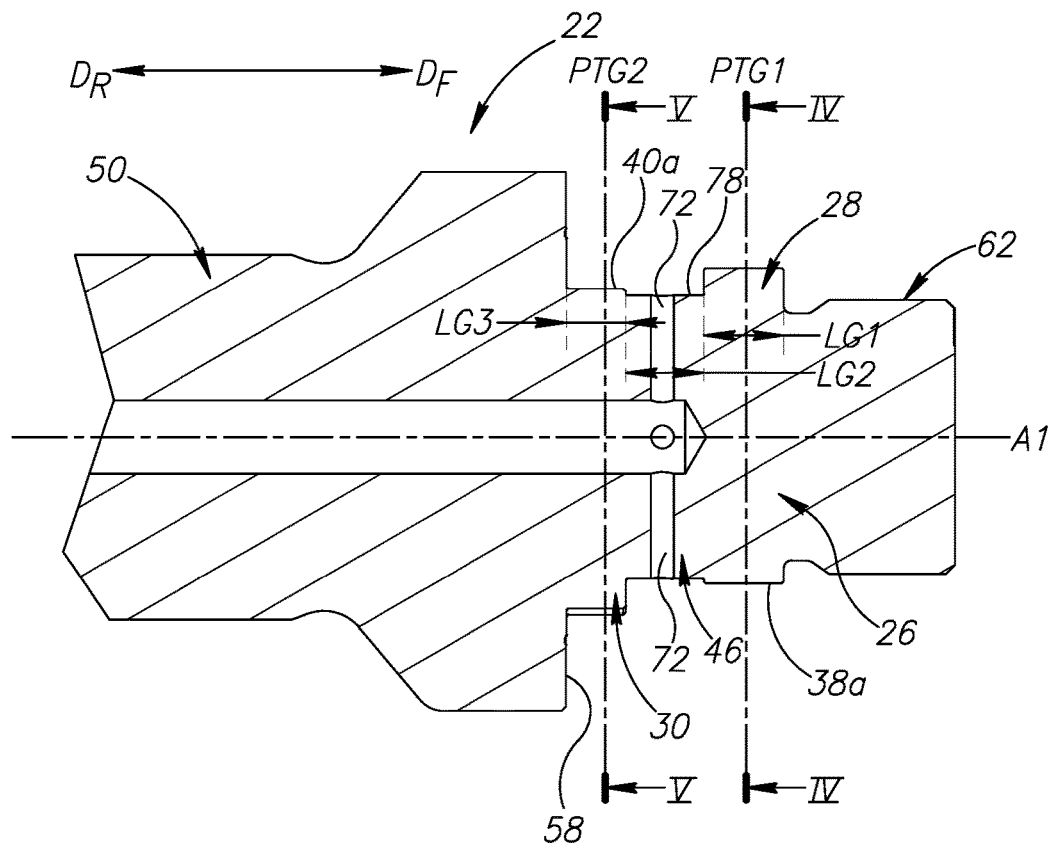
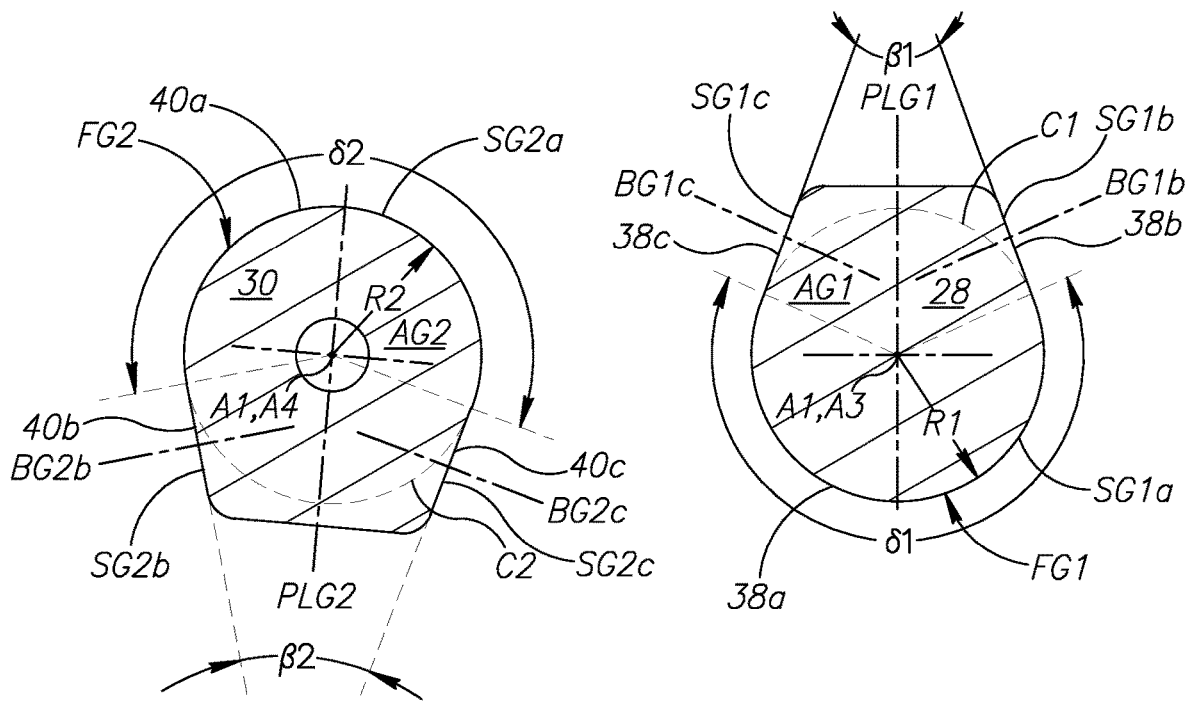
FIG.3
FIG.5
FIG.4

FOOL-PROOF TOOL COUPLING HAVING AXIALLY SPACED APART DRIVE MEMBERS AND ASSEMBLY METHOD THEREFOR

FIELD OF THE INVENTION

The present invention relates to a fool-proof tool coupling and assembly method therefor for use in metal cutting processes in general, and for rotary machining operations in particular.

BACKGROUND OF THE INVENTION

Within the field of metal cutting tools, there are examples of tool couplings comprising a first member having a male coupling portion and a second member having a female coupling portion, whereby the male and female coupling portions prevent rotation of the second member relative to the first member and disallow incorrect assembly of the tool coupling.

U.S. Pat. No. 8,708,611 discloses a T-slot cutter comprising a cutting head and a shank. The cutting head has opposing head top and intermediate surfaces with a head peripheral surface extending therebetween, and a plurality of cutting portions located along the head peripheral surface. A head bore extending along a head rotation axis opens out to the head top surface. The head bore includes a head centering portion and an axially offset head torque-transferring portion. The shank extends along a shank rotation axis and includes a shank centering portion axially offset from a shank torque-transferring portion. The shank is configured for engagement with the cutting head, whereby the shank torque-transfer portion engages the head torque-transfer portion, and the shank centering portion engages the head centering portion.

It is an object of the present invention to provide an improved fool-proof tool coupling.

It is also an object of the present invention to provide an improved fool-proof tool coupling which can be efficiently manufactured with a high level of accuracy.

It is a further object of the present invention to provide an improved fool-proof tool coupling whereby the risk of inadvertent separation is reduced.

SUMMARY OF THE INVENTION

In accordance with the present invention, there is provided a tool coupling comprising a first member and a second member coupled to the first member,
  the first member having a male coupling portion extending along a first axis in a forward-to-rearward direction,
  the second member having a female coupling portion extending along a second axis coaxial with the first axis,
    the male coupling portion having a front drive member located axially forward of a rear drive member, the male front and rear drive members defining front and rear footprints in respective first and second transverse drive planes perpendicular to the first axis and intersecting the front and rear drive members,
    the female coupling portion having axially spaced apart front and rear drive passages, the front and rear drive passages defining front and rear peripheral profiles in respective first and second transverse passage planes perpendicular to the second axis and intersecting the front and rear drive passages,
  wherein:
    the front drive member occupies the front drive passage, and
    the rear drive member occupies the rear drive passage,
  wherein:
    the first transverse drive plane and the first transverse passage plane are coincident;
    the second transverse drive plane and the second transverse passage plane are coincident;
    during imaginary rotation of the front peripheral profile by 360 degrees about the second axis, the front peripheral profile overlaps the front footprint,
    during imaginary rotation of the rear peripheral profile by 360 degrees about the second axis, the rear peripheral profile overlaps the rear footprint, and
    at least one of the front and rear drive members prevents rotation of the second member about the second axis relative to the first member,
  and wherein:
    upon axial projection of the front peripheral profile onto the second transverse drive plane, and imaginary rotation of the front peripheral profile by any angle about the second axis, the front peripheral profile overlaps the rear footprint.

Also in accordance with the present invention, there is provided a method of assembling the tool coupling described above, comprising the steps of:
  initially positioning the second member axially forward of the first member, with the front drive passage axially forward of the rear drive passage and the second axis aligned with the first axis,
  rotating the first member about the first axis and/or rotating the second member about the second axis, until;
    upon axial projection of the rear peripheral profile onto the first transverse drive plane no region of the front footprint extends outside the rear peripheral profile,
  moving the second member axially rearwardly and/or moving the first member axially forwardly, until;
    the front drive member is located axially between the front and rear drive passages,
  rotating the first member about the first axis and/or rotating the second member about the second axis, until;
    upon axial projection of the rear peripheral profile onto the second transverse drive plane, no region of the rear footprint extends outside the rear peripheral profile, and
    upon axial projection of the front peripheral profile onto the first transverse drive plane, no region of the front footprint extends outside the front peripheral profile, and
  moving the second member axially rearwardly and/or moving the first member axially forwardly, until;
    the front drive member occupies the front drive passage, and
    the rear drive member occupies the rear drive passage.

Further in accordance with the present invention, there is provided a rotary cutting head comprising:
  front and rear end surfaces;
  a female coupling portion extending between the front and rear end surfaces along a second axis;
  an outer peripheral surface connecting the front and rear end surfaces; and
  a plurality of cutting portions circumferentially spaced about the outer peripheral surface, the female coupling portion comprising:
- a front drive passage having an eccentric, lobe-shaped front peripheral profile in a first transverse passage plane perpendicular to the second axis and intersecting the front drive passage; and
- a rear drive passage axially spaced apart from the front drive passage, and having an eccentric, lobe-shaped rear peripheral profile in a second transverse passage plane perpendicular to the second axis and intersecting the rear drive passage,
- wherein the eccentric, lobe-shaped female front and rear peripheral profiles are rotationally offset from one another, about the second axis.

BRIEF DESCRIPTION OF THE DRAWINGS

For a better understanding, the invention will now be described, by way of example only, with reference to the accompanying drawings in which chain-dash lines represent cut-off boundaries for partial views of a member and in which:

FIG. 3 is a cross-sectional view of a first member taken along a plane containing its first axis;

FIG. 4 is a cut view of the first member from FIG. 3, taken along the line IV-IV;

FIG. 5 is a cut view of the first member from FIG. 3, taken along the line V-V;

DETAILED DESCRIPTION OF THE INVENTION

Figure 1:
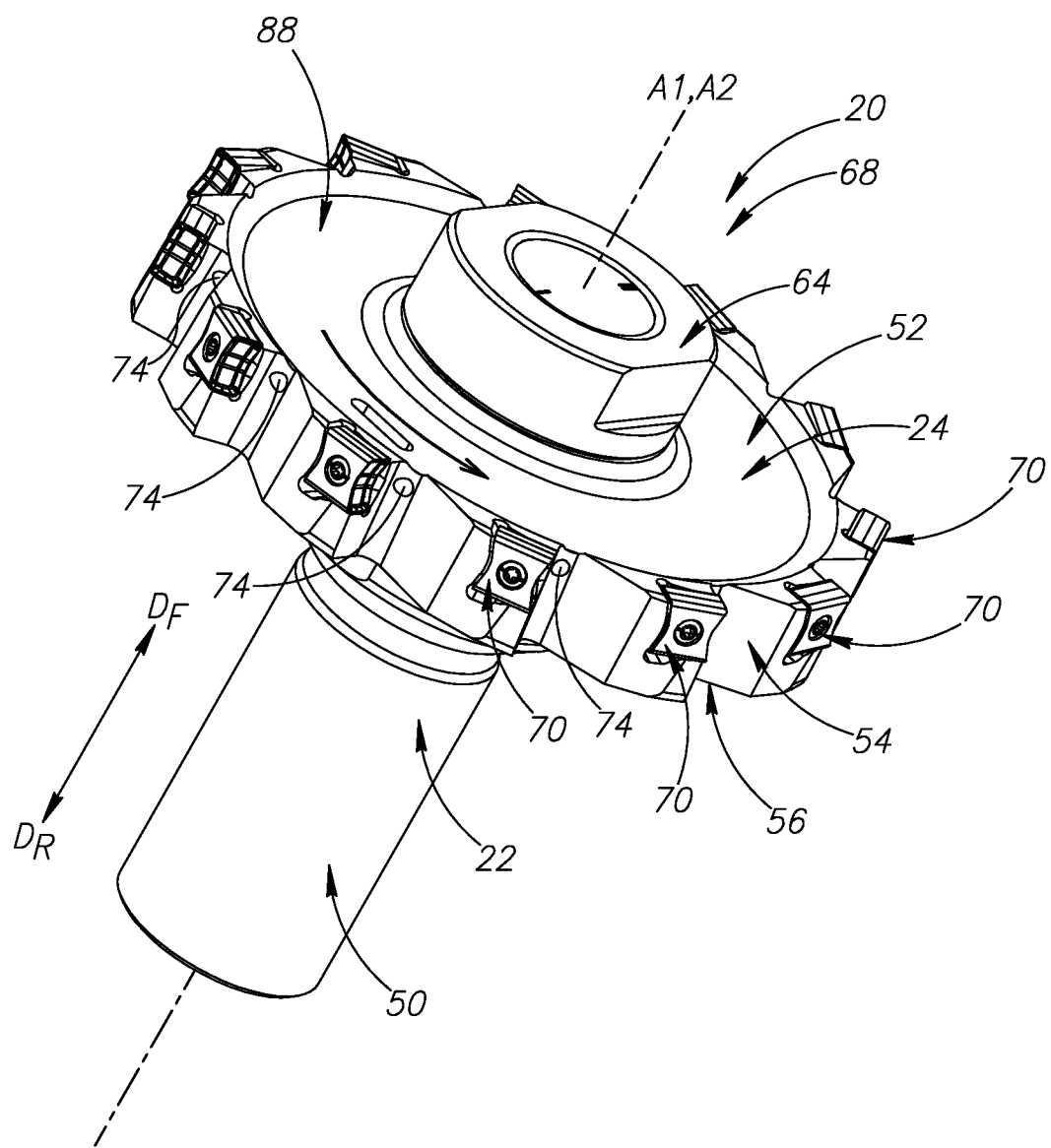
FIG. 1 is a perspective view of a tool coupling in accordance with some embodiments of the present invention.
Figure 2:
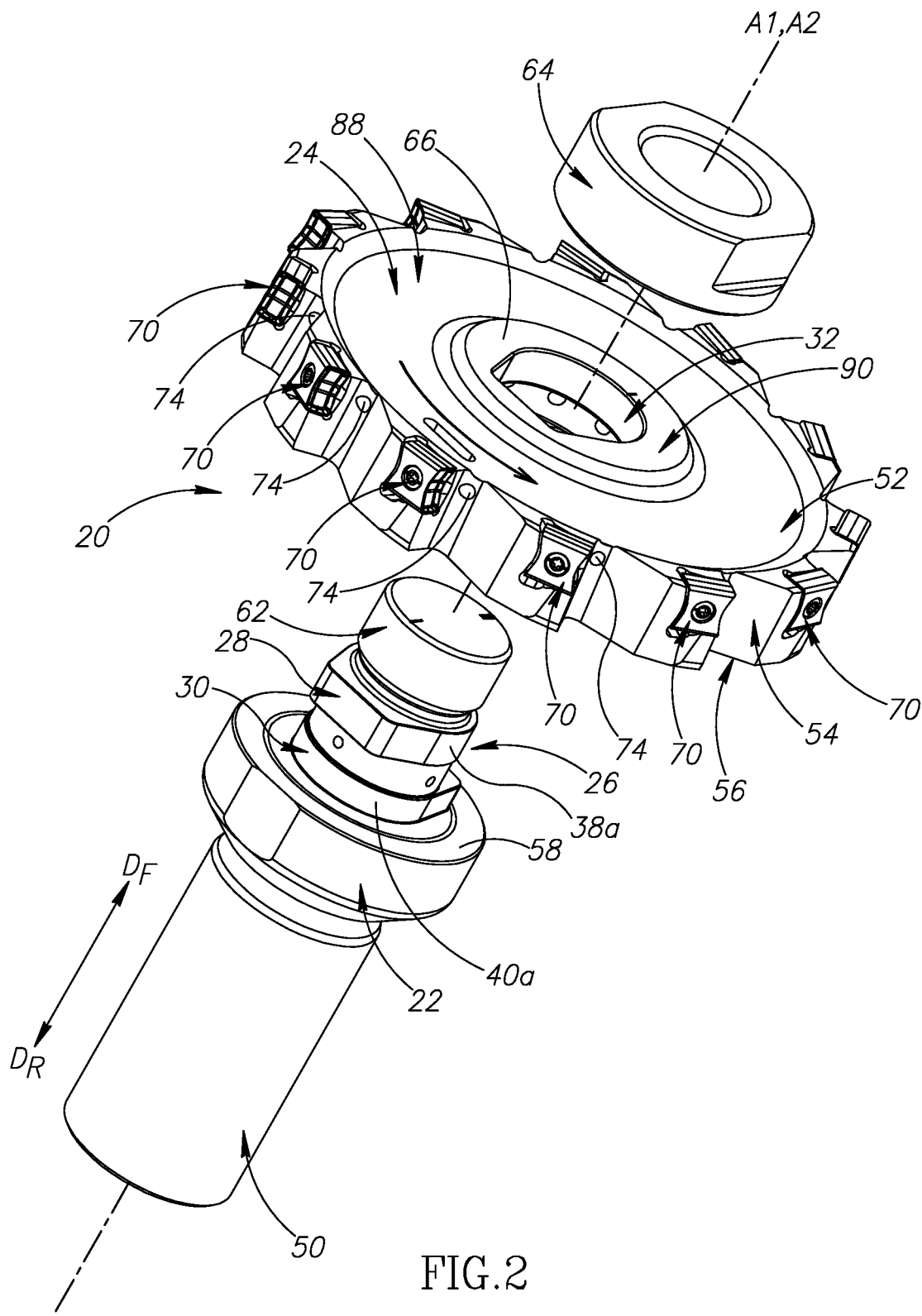
FIG. 2 is an exploded perspective view of the tool coupling shown in FIG. 1.

As shown in FIGS. 1 and 2, the present invention relates to a tool coupling 20 having a first member 22 and a second member 24 coupled to the first member 22.

As shown in FIG. 3, the first member 22 has a male coupling portion 26 extending along a first axis A1 in a forward-to-rearward direction DF, DR, and the male coupling portion 26 has a front drive member 28 located axially forward of a rear drive member 30.

As shown in FIGS. 4 and 5, the front and rear drive members 28, 30 define front and rear footprints FG1, FG2 in respective first and second transverse drive planes PTG1, PTG2 perpendicular to the first axis A1 and intersecting the front and rear drive members 28, 30.

In the embodiment of FIGS. 4 and 5, the front and rear footprints FG1, FG2 are seen to be lobe-shaped. The front and rear footprints FG1, FG2 are also seen to be eccentric about the first axis A1. However, other shapes and non-eccentric arrangements are also contemplated. The front and rear footprints FG1, FG2 are additionally seen to be rotationally offset from one another about the first axis A1 by a first angular extent. This first angular extent may be 180° which can be advantageous for mitigating wobble during rotation, however other angular amounts are also contemplated.

Figure 6:
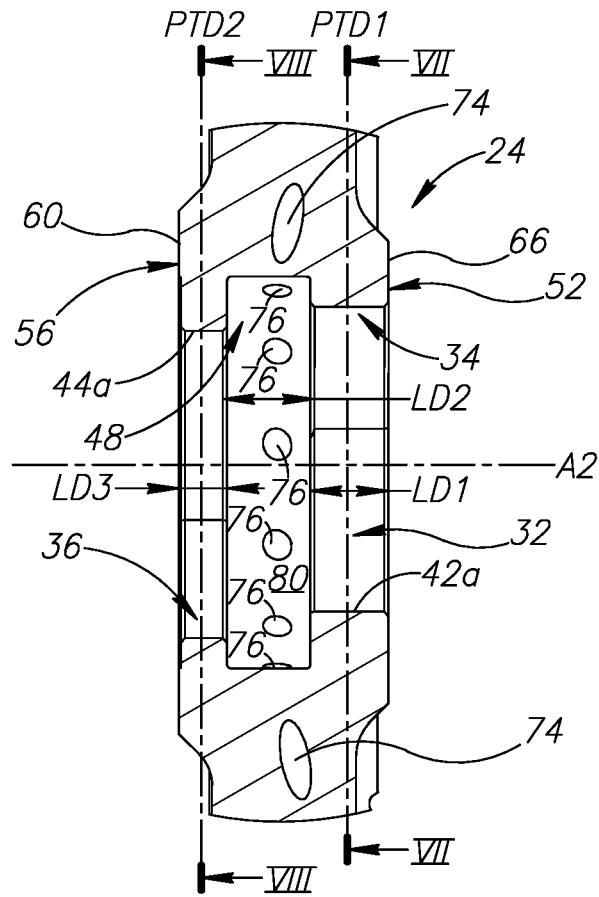
FIG. 6 is a cross-sectional view of a second member taken along a plane containing its second axis.

As shown in FIG. 6, the second member 24 comprises a female coupling portion 32 extending along a second axis A2, having axially spaced apart front and rear drive passages 34, 36.

As shown in FIGS. 1 and 2, in the assembled tool coupling 20, the second axis A2 is coaxial with the first axis A1.

Figures 7, 8:
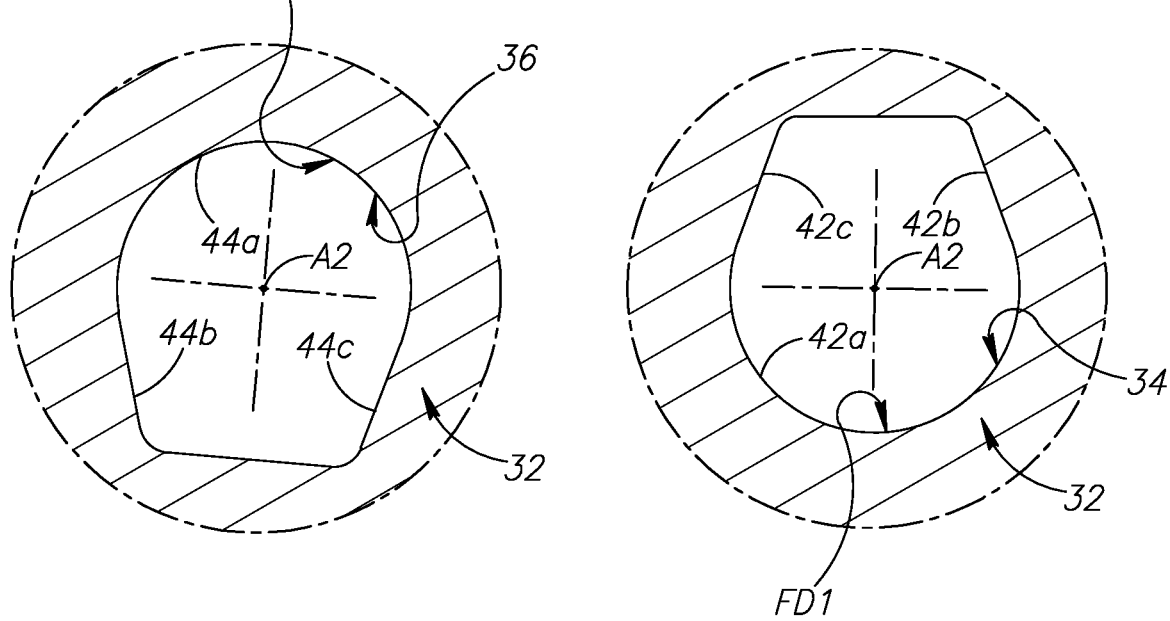
FIG. 7 is a cut view of the second member from FIG. 6, taken along the line VII-VII.
FIG. 8 is a cut view of the second member from FIG. 6, taken along the line VIII-VIII.

As shown in FIGS. 7 and 8, the front and rear drive passages 34, 36 have front and rear peripheral profiles FD1, FD2 in respective first and second transverse passage planes PTD1, PTD2 perpendicular to the second axis A2 and intersecting the front and rear drive passages 34, 36.

In the embodiment of FIGS. 7 and 8, the front and rear peripheral profiles FD1, FD2 are seen to be lobe-shaped. The front and rear peripheral profiles FD1, FD2 are also seen to be eccentric about the second axis A2. However, other shapes and non-eccentric arrangements are also contemplated. The front and rear peripheral profiles FD1, FD2 are additionally seen to be rotationally offset from one another about the second axis A2 by a second angular extent corresponding to the first angular extent. This second angular extent may be 180° which can be advantageous for mitigating wobble during rotation, however other angular amounts are also contemplated.

In some embodiments of the present invention, each of the front and rear peripheral profiles FD1, FD2 may circumscribe the second axis A2, and each of the front and rear drive passages 34, 36 may be devoid of resiliently displaceable elements.

Figure 9:
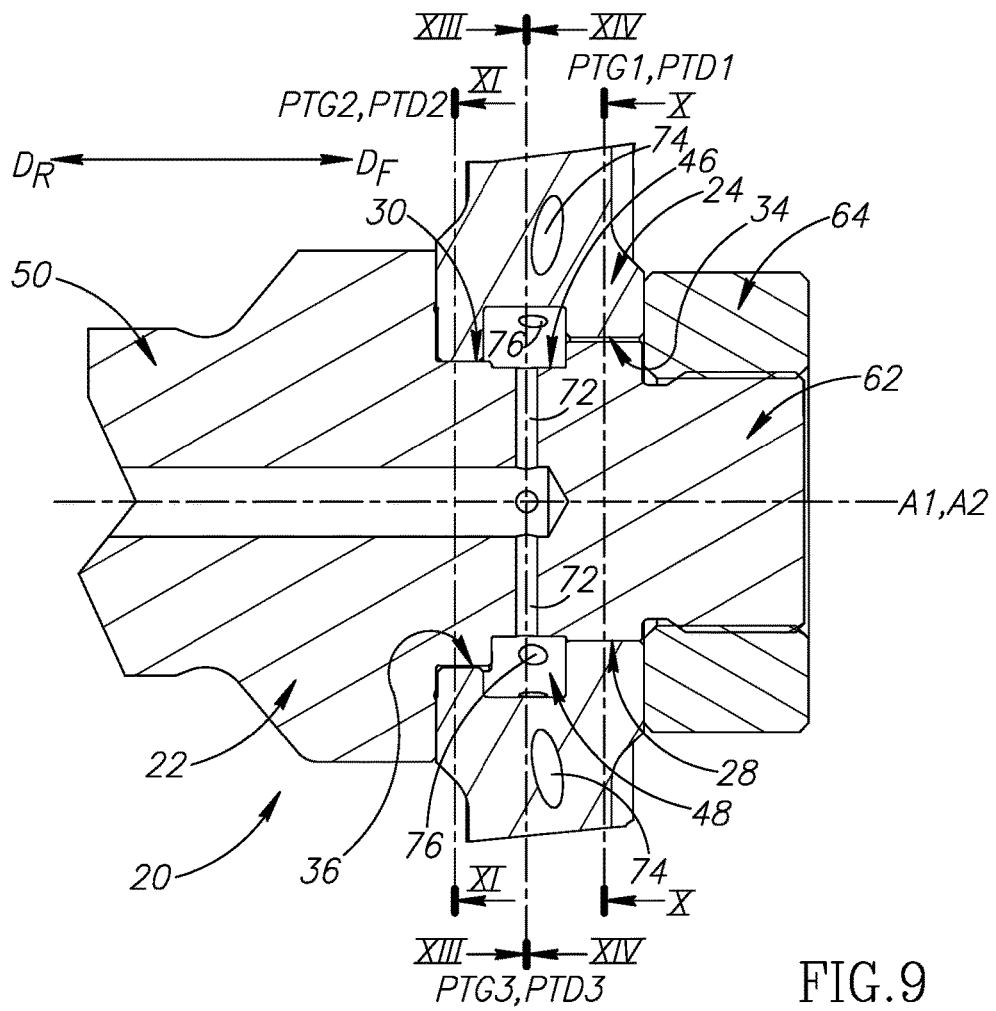
FIG. 9 is a cross-sectional view of the tool coupling taken along a plane containing the first and second axes.

As shown in FIG. 9, when the tool coupling 20 is assembled, the first transverse drive plane PTG1 and the first transverse passage plane PTD1 are coincident, and the second transverse drive plane PTG2 and the second transverse passage plane PTD2 are coincident.

As shown in FIG. 9, the front drive member 28 occupies the front drive passage 34 and the rear drive member 30 occupies the rear drive passage 36.

Figures 10, 11:
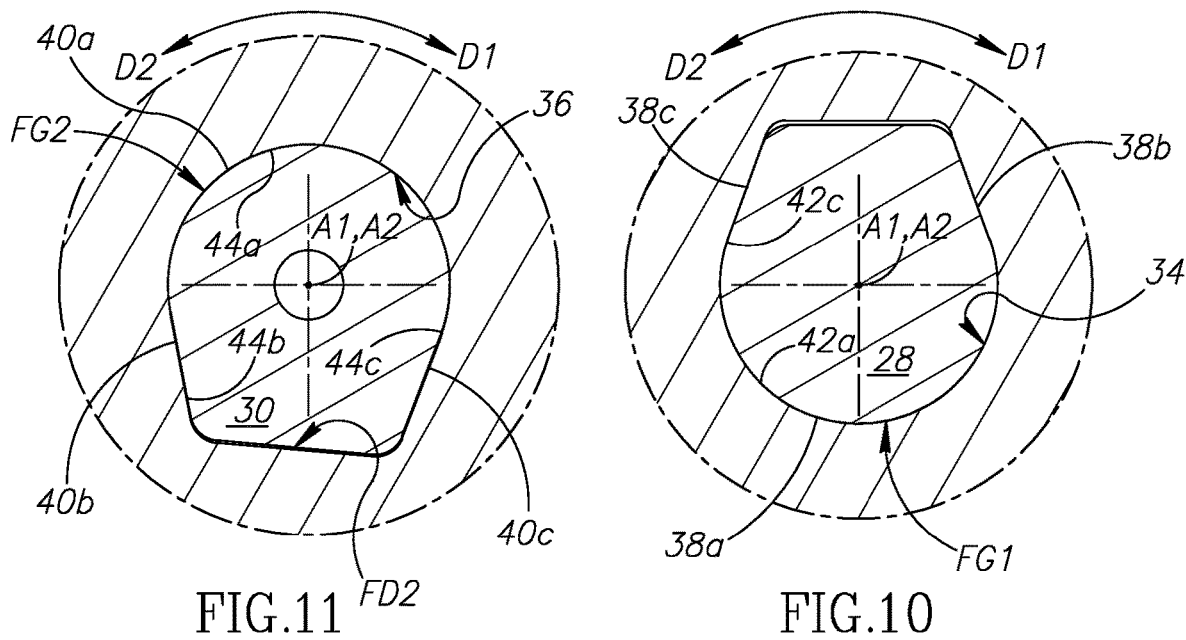
FIG. 10 is a cut view of the tool coupling from FIG. 9, taken along the line X-X.
FIG. 11 is a cut view of the tool coupling from FIG. 9, taken along the line XI-XI.

According to the present invention, and clear from FIGS. 10 and 11, during imaginary rotation of the front peripheral profile FD1 by 360 degrees about the second axis A2, the front peripheral profile FD1 overlaps (i.e., at least partially crosses in an axial view) the front footprint FG1, and during imaginary rotation of the rear peripheral profile FD2 by 360 degrees about the second axis A2, the rear peripheral profile FD2 overlaps the rear footprint FG2.

Thus, according to the present invention, at least one of the front and rear drive members 28, 30 prevents rotation of the second member 24 about the second axis A2 relative to the first member 22, thus enabling torque transfer between the first and second members 22, 24.

In some embodiments of the present invention, at least one of the front and rear footprints FG1, FG2 may exhibit 1-fold rotational symmetry about the first axis A1.

It should be appreciated that 1-fold rotational symmetry is exhibited when a shape or profile repeats itself only once every 360 degrees of rotation about an axis.

As shown in FIGS. 4 and 5, both the front and rear footprints FG1, FG2 may exhibit 1-fold rotational symmetry about the first axis A1.

In some embodiments of the present invention, at least one of:
  (i) the front footprint FG1 may have an arc-shaped first front mating segment SG1a with a constant front radius of curvature R1 about a third axis A3, and
  (ii) the rear footprint FG2 may have an arc-shaped first rear mating segment SG2a with a constant rear radius of curvature R2 about a fourth axis A4.

As shown in FIGS. 4 and 5, both the front and rear footprints FG1, FG2 may have arc-shaped first front and first rear mating segment SG1a, SG2a with constant front and rear radii of curvature R1, R2, respectively.

In some embodiments of the present invention, at least one of:
  (i) the first front mating segment SG1a may subtend a front peripheral angle δ1 of greater than 180 degrees about the third axis A3, and
  (ii) the first rear mating segment SG2a may subtend a rear peripheral angle δ2 of greater than 180 degrees about the fourth axis A4.

As shown in FIGS. 4 and 5, both the first front and first rear mating segment SG1a, SG2a may subtend front and rear peripheral angles δ1, δ2 of greater than 180 degrees, respectively.

For embodiments of the present invention in which the front and rear peripheral angles δ1, δ2 are greater than 180 degrees, the risk of the front and rear drive passages 34, 36 snagging or jamming on the front and rear drive members 28, 30, respectively, may be advantageously reduced.

Although the first front and rear mating segments SG1a, SG2a may subtend front and rear peripheral angles δ1, δ2 of greater than 180 degrees about their respective third and fourth axes A3, A4, it should be appreciated that in some embodiments of the present invention, the front and rear footprints FG1, FG2 may not be entirely circular.

In some embodiments of the present invention, at least one of the third and fourth axes A3, A4 may be coaxial with the first axis A1.

As shown in FIGS. 4 and 5, both the third and fourth axes A3, A4 may be coaxial with the first axis A1.

For embodiments of the present invention, in which the third and fourth axes A3, A4 are coaxial with the first axis A1, it should be appreciated that the non-circularity of the front and/or rear footprints FG1, FG2 may provide a means of preventing rotation of the second member 24 about the second axis A2 relative to the first member 22 and enable torque transfer between the first and second members 22, 24.

As shown in FIGS. 2 to 5, the first front mating segment SG1a may be contained in a front peripheral centering surface 38a of the front drive member 28, and the first rear mating segment SG2a may be contained in a rear peripheral centering surface 40a of the rear drive member 30.

For embodiments of the present invention, in which the third and fourth axes A3, A4 are coaxial with the first axis A1, it should be appreciated the front and rear peripheral centering surfaces 38a, 40a may be efficiently manufactured with a high level of accuracy.

As shown in FIGS. 10 and 11, the front peripheral centering surface 38a may correspond with a front peripheral centered surface 42a of the front drive passage 34 and the rear peripheral centering surface 40a may correspond with a rear peripheral centered surface 44a of the rear drive passage 36.

In some embodiments of the present invention, the front peripheral centering surface 38a may be in sliding contact the front peripheral centered surface 42a and the rear peripheral centering surface 40a may be in sliding contact with the rear peripheral centered surface 44a.

Also, in some embodiments of the present invention, the front peripheral centering surface 38a and the rear peripheral centering surface 40a may be parallel to the first axis A1.

In some embodiments of the present invention, at least one of:
  (i) the front footprint FG1 may include distinct second and third front mating segments SG1b, SG1c, and
  (ii) the rear footprint FG2 may include distinct second and third rear mating segments SG2b, SG2c.

As shown in FIGS. 4 and 5, both the front and rear footprints FG1, FG2 may include second and third front and second and third rear mating segments SG1b, SG1c; SG2b, SG2c, respectively.

As shown in FIGS. 2 to 5, the second and third front mating segments SG1b, SG1c may be contained in second and third peripheral front drive surfaces 38b, 38c of the front drive member 28, and the second and third rear mating segments SG2b, SG2c may be contained in second and third peripheral rear drive surfaces 40b, 40c of the rear drive member 30.

It should be appreciated that the second and third peripheral front drive surfaces 38b, 38c and/or the second and third peripheral rear drive surfaces 40b, 40c may prevent rotation of the second member 24 about the second axis A2 relative to the first member 22 and enable torque transfer between the first and second members 22, 24.

In some embodiments of the present invention, at least one of:
  (i) the second and third front mating segments SG1b, SG1c may converge radially outwardly, and
  (ii) the second and third rear mating segments SG2b, SG2c may converge radially outwardly.

As shown in FIGS. 4 and 5, both the second and third front mating segments SG1b, SG1c and the second and third rear mating segments SG2b, SG2c may converge radially outwardly.

In some embodiments of the present invention, at least one of:
  (i) the second and third front mating segments SG1b, SG1c form an acute internal front wedge angle β1, and
  (ii) the second and third rear mating segments SG2b, SG2c form an acute internal rear wedge angle β2.

As shown in FIGS. 4 and 5, both the second and third front mating segments SG1b, SG1c and the second and third rear mating segments SG2b, SG2c may form acute internal front and rear wedge angles β1, β2, respectively.

In some embodiments of the present invention, the front and/or rear wedge angles β1, β2 may be less than 60 degrees.

For embodiments of the present invention in which the front and/or rear wedge angles β1, β2 are less than 60 degrees, it should be appreciated that torque can be efficiently transferred between the first and second members 22, 24.

In some embodiments of the present invention, at least one of:

(i) the second and third front mating segments SG1*b*, SG1*c* may be linear and bisected by second and third front mating bisectors BG1*b*, BG1*c*, respectively, not containing the first axis A1, and (ii) the second and third rear mating segments SG2*b*, SG2*c* may be linear and bisected by second and third rear mating bisectors BG2*b*, BG2*c*, respectively, not containing the first axis A1.

As shown in FIGS. 4 and 5, both the second and third front mating segments SG1*b*, SG1*c* and the second and third rear mating segments SG2*b*, SG2*c* may be linear and bisected by second and third front and second and third rear mating bisectors BG1*b*, BG1*c*; BG2*b*, BG2*c*, respectively, not containing the first axis A1.

In some embodiments of the present invention, at least one of:

(i) the second and third front mating segments SG1*b*, SG1*c* may exhibit mirror symmetry about a first longitudinal mating plane PLG1 containing the first axis A1, and (ii) the second and third rear mating segments SG2*b*, SG2*c* may exhibit mirror symmetry about a second longitudinal mating plane PLG2 containing the first axis A1.

As shown in FIGS. 4 and 5, both the second and third front mating segments SG1*b*, SG1*c* and the second and third rear mating segments SG2*b*, SG2*c* may exhibit mirror symmetry about first and second longitudinal mating planes PLG1, PLG2 containing the first axis A1.

In some embodiments of the present invention, at least one of:

(i) no portions of the second and third front mating segments SG1*b*, SG1*c* may be located inside a first imaginary circle C1 defined by the front radius of curvature R1, and (ii) no portions of the second and third rear mating segments SG2*b*, SG2*c* may be located inside a second imaginary circle C2 defined by the rear radius of curvature R2.

As shown in FIGS. 4 and 5, no portions of the second and third front mating segments SG1*b*, SG1*c* and no portions of the second and third rear mating segments SG2*b*, SG2*c* may be located inside the first and second imaginary circles C1, C2, respectively.

In some embodiments of the present invention, the second and third front mating segments SG1*b*, SG1*c* may be tangential to the first imaginary circle C1, and/or the second and third rear mating segments SG2*b*, SG2*c* may be tangential to the second imaginary circle C2.

As shown in FIGS. 10 and 11, the second and third peripheral front drive surfaces 38*b*, 38*c* may correspond with second and third peripheral front driven surfaces 42*b*, 42*c* of the front drive passage 34 and/or the second and third peripheral rear drive surfaces 40*b*, 40*c* may correspond with second and third peripheral rear driven surfaces 44*b*, 44*c* of the rear drive passage 36.

It should be appreciated that on rotation of the first member 22 in a first direction of rotation D1 about the first axis A1, the second peripheral front drive surface 38*b* may be in abutting contact with the second peripheral front driven surface 42*b* and/or the second peripheral rear drive surface 40*b* may be in abutting contact with the second peripheral rear driven surface 44*b*.

The provision of simultaneous abutting contact between the second peripheral front drive surface 38*b* and the second peripheral front driven surface 42*b* and between the second peripheral rear drive surface 40*b* and the second peripheral rear driven surface 44*b*, may be dependent on the manufacturing tolerances of the front and rear drive members 28, 30 and the front and rear drive passages 34, 36. Thus, in some instances, only one of the front and rear drive members 28, 30 of the first member 22 may actually transfer torque to the second member 24 via one of the front and rear drive passages 34, 36.

It should also be appreciated that on rotation of the first member 22 in a second direction of rotation D2 about the first axis A1, the third peripheral front drive surface 38*c* may be in abutting contact with the third peripheral front driven surface 42*c* and/or the third peripheral rear drive surface 40*c* may be in abutting contact with the third peripheral rear driven surface 44*c*.

The provision of simultaneous abutting contact between the third peripheral front drive surface 38*c* and the third peripheral front driven surface 42*c* and between the third peripheral rear drive surface 40*c* and the third peripheral rear driven surface 44*c*, may be dependent on the manufacturing tolerances of the front and rear drive members 28, 30 and the front and rear drive passages 34, 36.

In some embodiments of the present invention, the second and third peripheral front drive surfaces 38*b*, 38*c* and the second and third peripheral rear drive surfaces 40*b*, 40*c* may be parallel to the first axis A1.

Also, in some embodiments of the present invention, the second and third peripheral front drive surfaces 38*b*, 38*c* and the second and third peripheral rear drive surfaces 40*b*, 40*c* may be planar.

Further, in some embodiments of the present invention, as shown in FIGS. 10 and 11, at least one of:

(i) the front peripheral profile FD1 may correspond with the front footprint FG1, and (ii) the rear peripheral profile FD2 may correspond with the rear footprint FG2.

Figure 12:
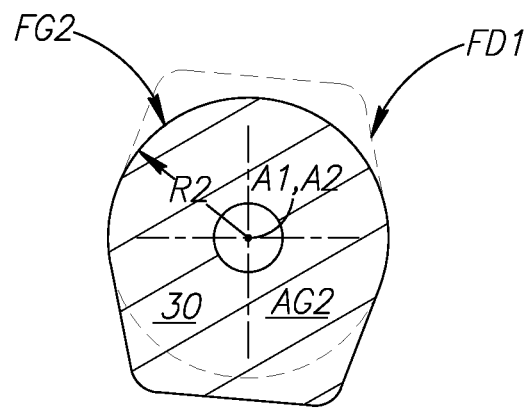
FIG. 12 is a view of a profile from FIG. 7 projected onto FIG. 5.

According to the present invention, and clear from FIG. 12, upon axial projection of the front peripheral profile FD1 onto the second transverse drive plane PTG2, and imaginary rotation of the front peripheral profile FD1 by any angle about the second axis A2, the front peripheral profile FD1 always overlaps the rear footprint FG2.

It should be appreciated that the overlap between the front peripheral profile FD1 and the rear footprint FG2 disallows a situation in which the rear drive member 30 occupies the front drive passage 34.

Thus, the assembled tool coupling 20 may only be configured in the above described arrangement, in which the front drive member 28 occupies the front drive passage 34 and the rear drive member 30 occupies the rear drive passage 36. Such a tool coupling 20 may be described as 'foolproof', since the first member 22 can only be inserted into the second member 24, or equivalently, the second member 24 can only be mounted onto the first member 22, when the front drive passage 34 is located axially forward of the rear drive passage 36, with respect to the forward-to-rearward direction DF, DR.

Visual markings or indications may be provided on the second member 24, to assist the operator during assembly of the tool coupling 20.

In some embodiments of the present invention, the front and rear footprints FG1, FG2 may circumscribe front and rear mating areas AG1, AG2, and the front mating area AG1 may be less than the rear mating area AG2.

Also, in some embodiments of the present invention, the rear radius of curvature R2 may be greater than the front radius of curvature R1.

As shown in FIGS. 2 and 3, the front and rear drive members 28, 30 may be axially spaced apart by an intermediate drive portion 46, and the front and rear drive passages 34, 36 may be axially spaced apart by an intermediate passage portion 48.

Figure 13:
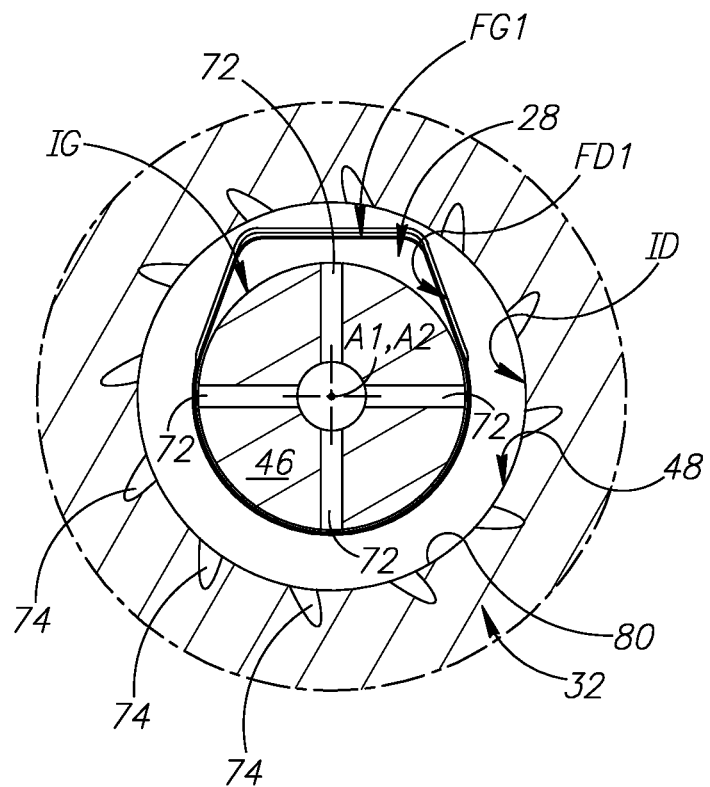
FIG. 13 is a cross-sectional view of the tool coupling shown in FIG. 9, taken along the line XIII-XIII in a first direction.
Figure 14:
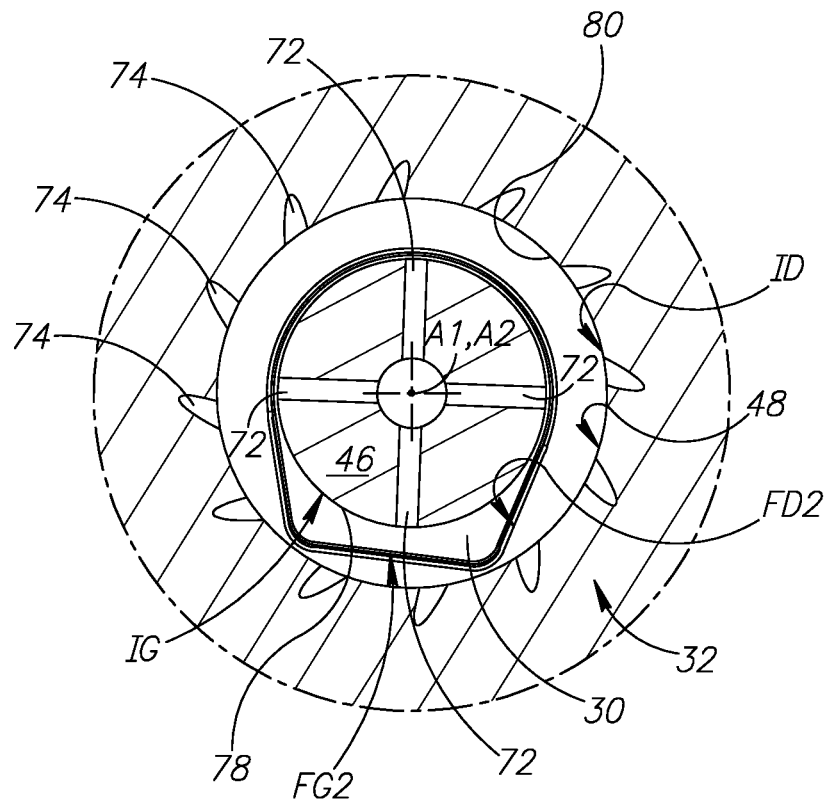
FIG. 14 is a cross-sectional view of the tool coupling shown in FIG. 9, taken along the line XIII-XIII in an opposite second direction.

As shown in FIGS. 13 and 14, in cross-sections taken in a third transverse passage plane PTD3 perpendicular to the second axis A2 and intersecting the intermediate passage portion 48, the intermediate passage portion 48 has an intermediate passage profile ID.

In some embodiments of the present invention, as clear from FIG. 13, upon axial projection of the intermediate passage profile ID onto the first transverse passage plane PTD1, the entire front peripheral profile FD1 may be contained inside the intermediate passage profile ID, and as clear from FIG. 14, upon axial projection of the intermediate passage profile ID onto the second transverse passage plane PTD2, the entire rear peripheral profile FD2 may be contained inside the intermediate passage profile ID.

Also, in some embodiments of the present invention, the intermediate passage profile ID may exhibit N-fold or infinite rotational symmetry about the second axis A2.

It should be appreciated that a circle exhibits infinite rotational symmetry about its axis.

As shown in FIGS. 13 and 14, in cross-sections taken in a third transverse drive plane PTG3 perpendicular to the second axis A2 and intersecting the intermediate drive portion 46, the intermediate drive portion 46 has an intermediate drive profile IG.

In some embodiments of the present invention, upon axial projection of the intermediate drive profile IG onto the first transverse drive plane PTG1, as clear from FIG. 13, no region of the intermediate drive profile IG may extend outside the front footprint FG1, and as clear from FIG. 14, upon axial projection of the intermediate drive profile IG onto the second transverse drive plane PTG2, no region of the intermediate drive profile IG may extend outside the rear footprint FG2.

Also, in some embodiments of the present invention, the intermediate drive profile IG may exhibit N-fold or infinite rotational symmetry about the first axis A1.

As shown in FIG. 9, the third transverse drive plane PTG3 and the third transverse passage plane PTD3 may be coincident.

As shown in FIG. 3, the front drive member 28, the intermediate drive portion 46 and the rear drive member 30 have respective front, intermediate and rear axial drive lengths LG1, LG2, LG3 measured along the first axis A1. As seen in FIG. 6, the front drive passage 34, the intermediate passage portion 48 and the rear drive passage 36 have respective front, intermediate and rear axial passage lengths LD1, LD2, LD3 measured along the second axis A2.

In some embodiments of the present invention, as shown in FIG. 9, the intermediate axial passage length LD2 may be greater than the front axial drive length LG1, and the intermediate axial drive length LG2 may be greater than the rear axial passage length LD3.

Figure 15:
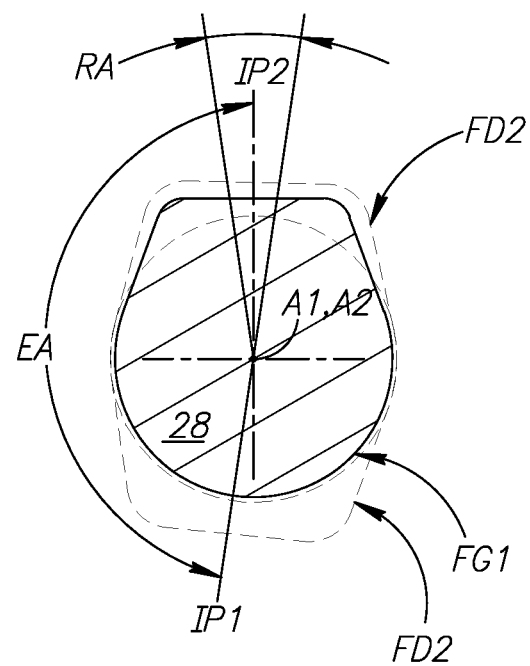
FIG. 15 is a view of a profile from FIG. 8 projected onto FIG. 4, at two imaginary rotational positions.

Also, in some embodiments of the present invention, as shown in FIG. 15, upon axial projection of the rear peripheral profile FD2 onto the first transverse drive plane PTG1, the rear peripheral profile FD2 may overlap the front footprint FG1.

For such a configuration in which the rear peripheral profile FD2 overlaps the front footprint FG1, dis-assembly of the tool coupling 20 cannot simply occur by only axially moving the first member 22 relative to the second member 24.

Thus, for such a configuration, the risk of inadvertent separation of the second member 24 from the first member 22 may be advantageously reduced.

It should be appreciated that for embodiments of the present invention in which the intermediate axial passage length LD2 is greater than the front axial drive length LG1, and the intermediate axial drive length LG2 is greater than the rear axial passage length LD3, the intermediate drive portion 46 and the intermediate passage portion 48 may provide for an intermediate stage of dis-assembly and assembly of the tool coupling 20.

It should be further appreciated that the intermediate stage of dis-assembly of the tool coupling 20 may involve axial rotation of the second member 24 relative to the first member 22 from a final rotational position to an intermediate rotational position.

Visual markings or indications may be provided on the first member 22 and on the second member 24 to assist the operator during rotation of the second member 24 relative to the first member 22.

In some embodiments of the present invention, as shown in FIG. 15, upon axial projection of the rear peripheral profile FD2 onto the first transverse drive plane PTG1, followed by imaginary rotation of the rear peripheral profile FD2 about the second axis A2 from a first imaginary rotational position IP1 to a second imaginary rotational position IP2, the rear peripheral profile FD2 may not overlap the front footprint FG1.

As shown in FIG. 15, the second imaginary rotational position IP2 may be rotationally offset from the first imaginary rotational position IP1 by an imaginary angular extent EA, and the imaginary angular extent EA may be greater than 60 degrees in both directions about the second axis A2.

It should be appreciated that imaginary rotation of the rear peripheral profile FD2 about the second axis A2 from the first imaginary rotational position IP1 to the second imaginary rotational position IP2 may correspond to the axial rotation of the second member 24 relative to the first member 22 from the final rotational position to the intermediate rotational position.

It should also be appreciated that axial rotation of the second member 24 from the final rotational position to the intermediate rotational position may be performed in either direction about the second axis A2.

In some embodiments of the present invention, the second imaginary rotational position IP2 may have an imaginary angular range RA of between 5 and 30 degrees, in which no region of the front footprint FG1 may extend outside the rear peripheral profile FD2.

It should be further appreciated that for embodiments of the present invention in which the imaginary angular range RA of the second imaginary rotational position IP2 is between 5 and 30 degrees, the rear drive passage 36 may efficiently allow the front drive member 28 to pass therethrough during assembly and dis-assembly of the tool coupling 20.

As shown in FIGS. 1 and 2, the first member 22 may have a shank portion 50 extending rearwardly from the male coupling portion 26.

As shown in FIGS. 1, 2 and 6, the second member 24 may have a front end surface 52 facing in the forward direction DF, and an outer peripheral surface 54 intersecting the front end surface 52.

In some embodiments of the present invention, as shown in FIGS. 2 and 6, the second member 24 may have a rear end surface 56 opposing the front end surface 52 and facing in the rearward direction DR, and the outer peripheral surface 54 may extend between the front and rear end surfaces 52, 56.

Also, in some embodiments of the present invention, the female coupling portion 32 may extend between the front and rear end surfaces 52, 56 along the second axis A2.

As shown in FIGS. 2, 6 and 9, the shank portion 50 may have an annular-shaped shoulder surface 58 facing in the forward direction DF, the rear drive passage 36 may open out to an annular-shaped rear hub surface 60 on the rear end surface 56, and the rear hub surface 60 may make continuous annular contact with the shoulder surface 58.

In some embodiments of the present invention, the shoulder surface 58 may be planar and perpendicular to the first axis A1.

As shown in FIGS. 1, 2 and 9, the first member 22 may have a threaded locking portion 62 extending in the forward direction DF from the male coupling portion 26, and a locking nut 64 may threadingly engage the locking portion 62 to prevent axial movement of the second member 24 relative to the first member 22.

In some embodiments of the present invention, the front drive passage 34 may open out to an annular-shaped front hub surface 66 on the front end surface 52, and the front hub surface 66 may make continuous annular contact with the locking nut 64.

It should be appreciated that rotation of the second member 24 about the second axis A2 relative to the first member 22, may also be prevented by sufficient tightening of the locking nut 64 against the front hub surface 66.

The present invention also relates to a method of assembling the tool coupling 20, comprising the steps of:
(a) positioning the second member 24 axially forward of the first member 22, with the front drive passage 34 axially forward of the rear drive passage 36 and the second axis A2 aligned with the first axis A1,
(b) rotating the first member 22 about the first axis A1 and/or rotating the second member 24 about the second axis A2, until;
    upon axial projection of the rear peripheral profile FD2 onto the first transverse drive plane PTG1 no region of the front footprint FG1 extends outside the rear peripheral profile FD2,
(c) moving the second member 24 axially rearwardly and/or moving the first member 22 axially forwardly, until;
    the front drive member 28 is located axially between the front and rear drive passages 34, 36,
(d) rotating the first member 22 about the first axis A1 and/or rotating the second member 24 about the second axis A2, until;
    upon axial projection of the rear peripheral profile FD2 onto the second transverse drive plane PTG2, no region of the rear footprint FG2 extends outside the rear peripheral profile FD2, and
    upon axial projection of the front peripheral profile FD1 onto the first transverse drive plane PTG1, no region of the front footprint FG1 extends outside the front peripheral profile FD1, and
(e) moving the second member 24 axially rearwardly and/or moving the first member 22 axially forwardly, until;
    the front drive member 28 occupies the front drive passage 34, and
    the rear drive member 30 occupies the rear drive passage 36.

A method of assembling the above-described tool coupling 20, may also be considered to comprise:
(a') positioning the second member 24 axially forward of the first member 22, with the front drive passage 34 axially forward of the rear drive passage 36 and the second axis A2 aligned with the first axis A1;
(b') rotating the first member 22 relative to the second member 24 until the front drive member 28 is axially aligned with the rear drive passage 36;
(c') moving the second member 24 axially rearwardly and/or moving the first member 22 axially forwardly, until the front drive member 28 is located axially between the front and rear drive passages 34, 36,
(d') rotating the first member 22 about the first axis A1 and/or rotating the second member 24 about the second axis A2, until the rear drive member 30 is axially aligned with the rear drive passage 36 and the front drive member 28 is axially aligned with the front drive passage 34; and
(e') moving the second member 24 axially rearwardly and/or moving the first member 22 axially forwardly, until the front drive member 28 occupies the front drive passage 34, and the rear drive member 30 occupies the rear drive passage 36.

In the above methods, it should be appreciated that steps (b) and (b') correspond to the axial rotation of the second member 24 relative to the first member 22 from a random preliminary rotational position to the intermediate rotational position.

It should be appreciated that steps (d) and (d') correspond to the axial rotation of the second member 24 relative to the first member 22 from the intermediate rotational position to the final rotational position.

In some embodiments of the present invention, the method of assembling the tool coupling 20, may further include the step of:
(f) moving the second member 24 axially rearwardly and/or moving the first member 22 axially forwardly, until the rear hub surface 60 makes continuous annular contact with the shoulder surface 58.

Also, in some embodiments of the present invention, the method of assembling the tool coupling 20, may yet further include the step of:
(g) threadingly engaging a locking nut 64 to the locking portion 62, until the front hub surface 66 makes continuous annular contact with the locking nut 64.

As shown in FIGS. 1 and 2, the present invention may further relate to a rotary cutting tool 68 including the above described tool coupling 20, having the second member 24 in the form of a rotary cutting head 88. The above-described female coupling portion 32 may be included in a central portion 90 of the rotary cutting head 88. The rotary cutting head 88 also comprises front and rear end surfaces 52, 56 and an outer peripheral surface 54 connecting the front and rear end surfaces 52, 56. The rotary cutting head 88 further comprises a plurality of cutting portions 70 circumferentially spaced about the outer peripheral surface 54. The rotary cutting head 88 is mounted, via its female coupling portion 32, onto the male coupling portion 26 of the first member 22. A feature of the present invention is that the rotary cutting head 88 is "keyed" (by virtue of the present tool coupling 20) in the sense that the rotary cutting head 88 can only ever be mounted onto the first member 22 with the same predetermined end surface facing in the rearward direction DR. This "fool-proof" arrangement ensures that one cannot inadvertently assemble the cutting tool 68 with the rotary cutting head 88 reversed.

In some embodiments of the present invention, as shown in FIGS. 2, 3, 6 and 9, the first member 22 may include at least one drive coolant duct 72 opening out to an intermediate outer peripheral surface 78 of the intermediate drive portion 46, and the second member 24 may include a plurality of radially extending passage coolant ducts 74, each passage coolant duct 74 communicating the intermediate passage portion 48 with one of the plurality of cutting portions 70.

Also, in some embodiments of the present invention, the plurality of radially extending passage coolant ducts 74 may intersect an intermediate inner peripheral surface 80 of the intermediate passage portion 48 at a plurality of circumferentially equi-spaced passage coolant openings 76.

It should be appreciated that for embodiments of the present invention in which the intermediate inner peripheral surface 80 has a plurality of circumferentially equi-spaced passage coolant openings 76, the second member 24 may be efficiently manufactured and coolant may be efficiently distributed to the plurality of cutting portions 70.

As shown in FIGS. 1 and 2, the rotary cutting tool 68 may be in the form of a milling tool.

In the figures discussed above, the drive members' footprints and the drive passages' peripheral profiles were seen to be eccentric (about the axes A1, A2), lobe-shaped and rotationally offset from one another. However, none of these is an absolute requirement to form a fool-proof tool coupling. What is required, however, is that the front drive passage 34 be configured and dimensioned such that it cannot accommodate (and thus be occupied by) the rear drive member 30, regardless of the latter's rotational orientation about the first axis A1, and even if the front drive member 28 were inserted into the front drive passage 34 and passed into the intermediate passage portion 48. Therefore, in the assembled tool coupling 20 described above, when viewed along the second axis A2, the front drive passage's front peripheral profile FD1 will always overlap the rear drive member's rear footprint FG2, regardless of how one might rotate the front peripheral profile FD1 about the second axis A2, relative to the drive member's rear footprint FG2.

Although the present invention has been described to a certain degree of particularity, it should be understood that various alterations and modifications could be made without departing from the spirit or scope of the invention as hereinafter claimed.

What is claimed is:

1. A tool coupling (20) for a rotary cutting tool (68), the tool coupling (20) comprising:
a first member (22) and a second member (24), the second member (24) being coupled to the first member (22),
the first member (22) having a male coupling portion (26) extending along a first axis (A1) in a forward-to-rearward direction (DF, DR),
the second member (24) having a female coupling portion (32) extending along a second axis (A2) coaxial with the first axis (A1),
the male coupling portion (26) having a front drive member (28) located axially forward of a rear drive member (30), the male front and rear drive members (28, 30) defining front and rear footprints (FG1, FG2) in respective first and second transverse drive planes (PTG1, PTG2) perpendicular to the first axis (A1) and intersecting the front and rear drive members (28, 30),
the female coupling portion (32) having axially spaced apart front and rear drive passages (34, 36), the front and rear drive passages (34, 36) defining front and rear peripheral profiles (FD1, FD2) in respective first and second transverse passage planes (PTD1, PTD2) perpendicular to the second axis (A2) and intersecting the front and rear drive passages (34, 36),
wherein:
the front and rear drive members (28, 30) simultaneously occupy the front and rear drive passages (34, 36), respectively,
the first transverse drive plane (PTG1) and the first transverse passage plane (PTD1) are coincidental;
the second transverse drive plane (PTG2) and the second transverse passage plane (PTD2) are coincidental;
during imaginary rotation of the front peripheral profile (FD1) by 360 degrees about the second axis (A2), the front peripheral profile (FD1) overlaps the front footprint (FG1) when viewed along the second axis (A2),
during imaginary rotation of the rear peripheral profile (FD2) by 360 degrees about the second axis (A2), the rear peripheral profile (FD2) overlaps the rear footprint (FG2) when viewed along the second axis (A2), and
at least one of the front and rear drive members (28, 30) prevents rotation of the second member (24) about the second axis (A2) relative to the first member (22),
and wherein:
upon imaginary axial projection of the front peripheral profile (FD1) onto the second transverse drive plane (PTG2), and imaginary rotation of the front peripheral profile (FD1) by any angle about the second axis (A2), the front peripheral profile (FD1) always overlaps the rear footprint (FG2) when viewed along the second axis (A2).

2. The tool coupling (20) according to claim 1, wherein:
upon imaginary axial projection of the rear peripheral profile (FD2) onto the first transverse drive plane (PTG1), the rear peripheral profile (FD2) overlaps the front footprint (FG1) when viewed along the second axis (A2).

3. The tool coupling (20) according to claim 1, wherein:
upon imaginary axial projection of the rear peripheral profile (FD2) onto the first transverse drive plane (PTG1), and imaginary rotation of the rear peripheral profile (FD2) about the second axis (A2) from a first imaginary rotational position (IP1) to a second imaginary rotational position (IP2), the rear peripheral profile (FD2) does not overlap the front footprint (FG1) when viewed along the second axis (A2).

4. The tool coupling (20) according to claim 3, wherein:
the second imaginary rotational position (1P2) is rotationally offset from the first imaginary rotational position (IP1) by an imaginary angular extent (EA), and
the imaginary angular extent (EA) is greater than 60 degrees in both directions about the second (A2).

5. The tool coupling (20) according to claim 3, wherein:
the second imaginary rotational position (1P2) has an imaginary angular range (RA) of between 5 and 30 degrees.

6. The tool coupling (20) according to claim 1, wherein:
at least one of the front and rear footprints (FG1, FG2) exhibit 1-fold rotational symmetry about the first axis (A1).

7. The tool coupling (20) according to claim 1, wherein:
(i) the front footprint (FG1) has an arc-shaped first front mating segment (SG1a) having a constant front radius of curvature (R1) about a third axis (A3), and/or
(ii) the rear footprint (FG2) has an arc-shaped first rear mating segment (SG2a) having a constant rear radius of curvature (R2) about a fourth axis (A4).

8. The tool coupling (20) according to claim 7, wherein:
at least one of the third and fourth axes (A3, A4) are coaxial with the first axis (A1).

9. The tool coupling (20) according to claim 7, wherein:
(i) the first front mating segment (SG1a) subtends a front peripheral angle (δ1) of greater than 180 degrees about the third axis (A3), and/or
(ii) the first rear mating segment (SG2a) subtends a rear peripheral angle (δ2) of greater than 180 degrees about the fourth axis (A4).

10. The tool coupling (20) according to claim 7:
(i) the front footprint (FG1) includes distinct second and third front mating segments (SG1b, SG1c), and/or
(ii) the rear footprint (FG2) includes distinct second and third rear mating segments (SG2b, SG2c).

11. The tool coupling (20) according to claim 10, wherein:
(i) the second and third front mating segments (SG1b, SG1c) converge radially outwardly, and/or
(ii) the second and third rear mating segments (SG2b, SG2c) converge radially outwardly.

12. The tool coupling (20) according to claim 10, wherein:
(i) the second and third front mating segments (SG1b, SG1c) form an acute internal front wedge angle (β1), and/or
(ii) the second and third rear mating segments (SG2b, SG2c) form an acute internal rear wedge angle (β2).

13. The tool coupling (20) according to claim 10, wherein:
(i) no portions of the second and third front mating segments (SG1b, SG1c) are located inside a first imaginary circle (C1) defined by the front radius of curvature (R1), and/or
(ii) no portions of the second and third rear mating segments (SG2b, SG2c) are located inside a second imaginary circle (C2) defined by the rear radius of curvature (R2).

14. The tool coupling (20) according to claim 1, wherein:
the first member (22) has a shank portion (50) extending rearwardly from the male coupling portion (26), and
the second member (24) has opposing front and rear end surfaces (52, 56) facing in the forward and rearward directions (DF, DR), respectively.

15. The tool coupling (20) according to claim 14, wherein:
the shank portion (50) has an annular-shaped shoulder surface (58) facing in the forward direction (DF),
the rear drive passage (36) opens out to an annular-shaped rear hub surface (60) on the rear end surface (56), and
the rear hub surface (60) makes continuous annular contact with the shoulder surface (58).

16. The tool coupling (20) according to claim 14, wherein:
the first member (22) has a threaded locking portion (62) extending in the forward direction (DF) from the male coupling portion (26), and
a locking nut (64) threadingly engages the locking portion (62) to prevent axial movement of the second member (24) relative to the first member (22).

17. The tool coupling (20) according to claim 1, wherein:
the front drive member (28) has an eccentric, lobe-shaped front footprint (FG1) in the first transverse drive plane (PTG1);
the rear drive member (30) has an eccentric, lobe-shaped rear footprint (FG2) in the second transverse drive plane (PTG2);
the eccentric, lobe-shaped front and rear footprints (FG1, FG2) are rotationally offset from one another, about the first axis (A1);
the front drive passage (34) has an eccentric, lobe-shaped front peripheral profile (FD1) in the first transverse passage plane (PTD1);
the rear drive passage (36) has an eccentric, lobe-shaped rear peripheral profile (FD2) in the second transverse passage plane (PTD2); and
the eccentric, lobe-shaped female front and rear peripheral profiles (FD1, FD2) are rotationally offset from one another, about the second axis (A2).

18. The tool coupling (20) according to claim 1, wherein:
the front and rear drive members (28, 30) are axially spaced apart from one another by an intermediate drive portion (46), and
the front and rear drive passages (34, 36) are axially spaced apart from one another by an intermediate passage portion (48).

19. The tool coupling (20) according to claim 18, wherein:
the front drive member, the intermediate drive portion and the rear drive member (28, 46, 30) respectively have front, intermediate and rear axial drive lengths (LG1, LG2, LG3) measured along the first axis (A1), and
the front drive passage, the intermediate passage portion and the rear drive passage (34, 48, 36) respectively have front, intermediate and rear axial passage lengths (LD1, LD2, LD3) measured along the second axis (A2),
and wherein:
the intermediate axial passage length (LD2) is greater than the front axial drive length (LG1), and
the intermediate axial drive length (LG2) is greater than the rear axial passage length (LD3).

20. A rotary cutting tool (68) comprising:
the tool coupling (20) according to claim 18,
wherein:
the second member (24) has a front end surface (52) facing in the forward direction (DF), an outer peripheral surface (54) intersecting the front end surface (52), and a plurality of cutting portions (70) circumferentially spaced about the outer peripheral surface (54).

21. The rotary cutting tool (68) according to claim 20, wherein:
the first member (22) includes at least one mating coolant duct (72) opening out to an intermediate outer peripheral surface (78) of the intermediate drive portion (46), and
the second member (24) includes a plurality of radially extending passage coolant ducts (74), each passage coolant duct (74) communicating the intermediate passage portion (48) with one of the plurality of cutting portions (70).

22. The rotary cutting tool (68) according to claim 21, wherein:
the plurality of radially extending passage coolant ducts (74) intersect an intermediate inner peripheral surface (80) of the intermediate passage portion (48) at a plurality of circumferentially equi-spaced passage coolant openings (76).

* * * * *